US012182358B2

(12) United States Patent
Lin et al.

(10) Patent No.: US 12,182,358 B2
(45) Date of Patent: Dec. 31, 2024

(54) SYNCHRONIZATION METHOD AND CONTROLLER THEREOF

(71) Applicant: NOVATEK Microelectronics Corp., Hsin-Chu (TW)

(72) Inventors: Shih-Ming Lin, Hsinchu County (TW); Jiun-Jie Tsai, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/671,621

(22) Filed: Feb. 15, 2022

(65) Prior Publication Data

US 2022/0326805 A1 Oct. 13, 2022

Related U.S. Application Data

(60) Provisional application No. 63/171,583, filed on Apr. 7, 2021.

(51) Int. Cl.
*G06F 3/041* (2006.01)
*G06F 3/0354* (2013.01)

(52) U.S. Cl.
CPC ........ *G06F 3/0418* (2013.01); *G06F 3/03545* (2013.01); *G06F 3/04162* (2019.05)

(58) Field of Classification Search
CPC ............... G06F 3/0418; G06F 3/03545; G06F 3/04162; G06F 3/0383; G06F 3/04184; G06F 3/0488; G06F 3/0416
See application file for complete search history.

(56) References Cited

U.S. PATENT DOCUMENTS

| | | | |
|---|---|---|---|
| 9,830,000 B2 | 11/2017 | Westhues | |
| 2016/0195941 A1* | 7/2016 | Gur | G06F 3/0383 |
| | | | 345/173 |
| 2018/0088691 A1 | 3/2018 | Westhues | |
| 2018/0113519 A1 | 4/2018 | Yamamoto | |
| 2019/0113987 A1* | 4/2019 | Peretz | G06F 3/03545 |
| 2020/0210021 A1 | 7/2020 | Ju | |
| 2021/0286494 A1 | 9/2021 | Perez | |
| 2022/0200337 A1 | 6/2022 | Watanabe | |
| 2022/0214791 A1* | 7/2022 | Cho | G09G 3/3225 |

FOREIGN PATENT DOCUMENTS

| | | |
|---|---|---|
| CN | 102866796 A | 1/2013 |
| CN | 109582170 A | 4/2019 |
| CN | 110832447 A | 2/2020 |
| CN | 111492331 A | 8/2020 |
| CN | 111813256 A | 10/2020 |
| CN | 211787016 U | 10/2020 |
| CN | 111930253 A | 11/2020 |
| EP | 3 462 291 A1 | 4/2019 |
| JP | 2018-98319 A | 6/2018 |

(Continued)

*Primary Examiner* — Temesghen Ghebretinsae
*Assistant Examiner* — Ivelisse Martinez Quiles
(74) *Attorney, Agent, or Firm* — Winston Hsu

(57) ABSTRACT

A synchronization method between an active stylus and a touch device includes determining whether the active stylus approaches the touch device; starting a timing configuration process after the touch device receives a response signal from the active stylus; and starting a timing calibration process after the timing configuration process is completed.

19 Claims, 9 Drawing Sheets

(56) References Cited

FOREIGN PATENT DOCUMENTS

| KR | 10-2020-0025573 A | 3/2020 |
|----|-------------------|--------|
| TW | 201913343 A | 4/2019 |
| TW | I659351 B | 5/2019 |
| TW | 202014854 A | 4/2020 |
| TW | 202038062 A | 10/2020 |

* cited by examiner

SYNCHRONIZATION METHOD AND CONTROLLER THEREOF

CROSS REFERENCE TO RELATED APPLICATIONS

This application claims the benefit of U.S. provisional application No. 63/171,583 filed on Apr. 7, 2021, which is incorporated herein by reference.

BACKGROUND OF THE INVENTION

1. Field of the Invention

The present invention relates to a synchronization method and a controller thereof, and more particularly, to a synchronization method and a controller thereof to calibrate the transmission timing of an active stylus against touch device(s) and thereby improve efficiency and user experience.

2. Description of the Prior Art

Styluses of various types have been widely used as inputting devices on a display panel of an electronic device. Position detection of a stylus, which provides input to the electronic device and is interpreted as user commands, is performed when the stylus tip is either touching or hovering over the display panel. The position of the stylus over the display panel is correlated with virtual information portrayed on the display panel. However, there is still room for improvement when it comes to the timing configuration of a stylus for electronic device(s).

SUMMARY OF THE INVENTION

The present invention discloses a synchronization method between an active stylus and a touch device, comprising determining whether the active stylus approaches the touch device; starting a timing configuration process after the touch device receives a response signal from the active stylus; and starting a timing calibration process after the timing configuration process is completed.

The present invention further discloses a control circuit, for a touch device, comprising a processing circuit, configured to execute steps of determining whether the active stylus approaches the touch device; starting a timing configuration process after the touch device receives a response signal from the active stylus; and starting a timing calibration process after the timing configuration process is completed; and a storage circuit, coupled to the processing circuit.

The present invention further discloses a control circuit, for a computing device coupled to a touch device, comprising a processing circuit, configured to execute steps of instructing the touch device to start a timing configuration process after the touch device receives a response signal from the active stylus; and instructing the touch device to start a timing calibration process after the timing configuration process is completed; and a storage circuit, coupled to the processing circuit.

The present invention further discloses a control circuit, for an active stylus, comprising a processing circuit, configured to execute steps of detecting a presence of a touch device; transmitting a response signal to the touch device to start a timing configuration process; and starting a timing calibration process after the timing configuration process is completed; and a storage circuit, coupled to the processing circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
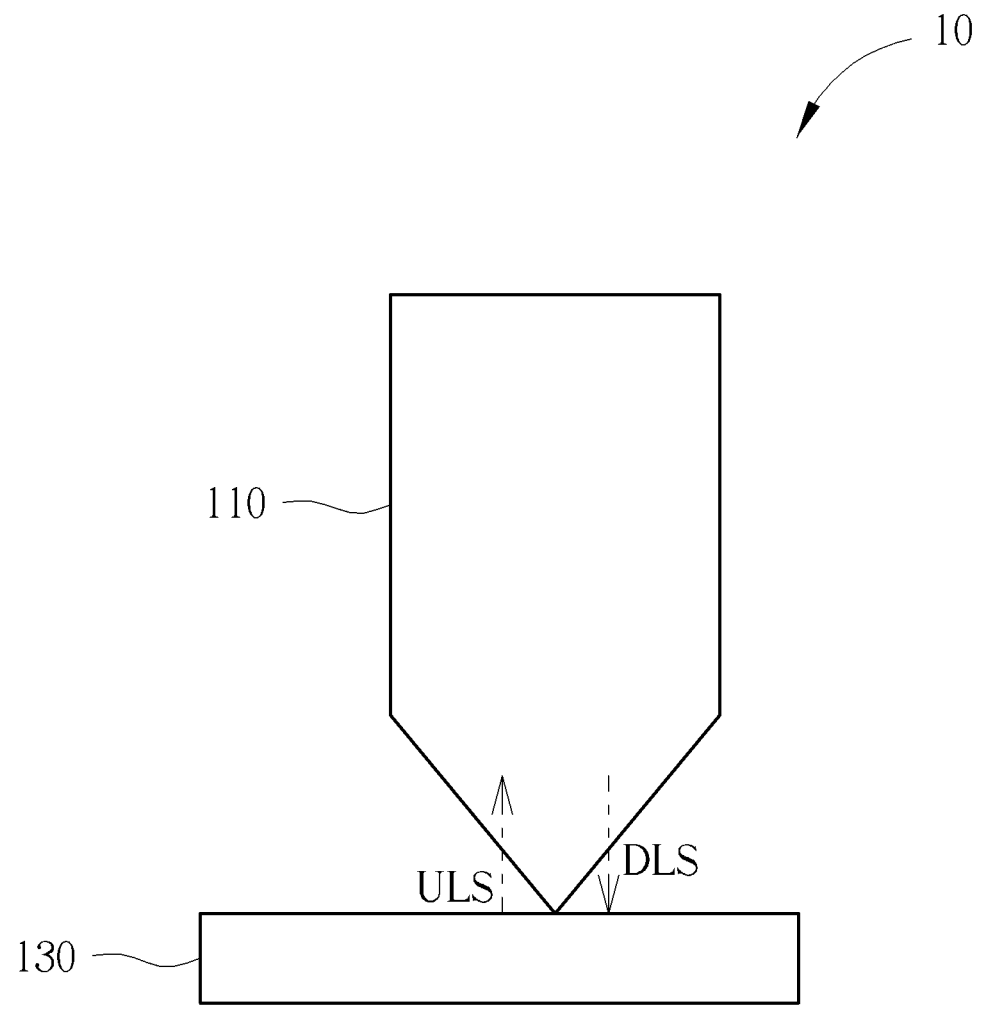
FIG. 1 is a schematic diagram of a system according to an embodiment of the present invention.

FIG. 1 is a schematic diagram of a system 10 according to an embodiment of the present invention. The system 10 may include an active stylus 110 and a touch device 130. The active stylus 110 is configured to detect an uplink signal ULS from the touch device 130 or transmit a downlink signal DLS to the touch device 130.

The (transmission) timing of the downlink signal DLS may be adjusted/configured to meet timing requirements/configuration of the touch device 130, such that, for example, the touch device 130 is able to receive the downlink signal DLS from the active stylus 110 in time. In other words, if the downlink signal DLS is transmitted from the active stylus 110 to the touch device 130 at the right time, touch operation of the touch device 130 may not interfere with display operation of the touch device 130, and the touch device 130 may receive the downlink signal DLS accurately/completely.

Figure 2:
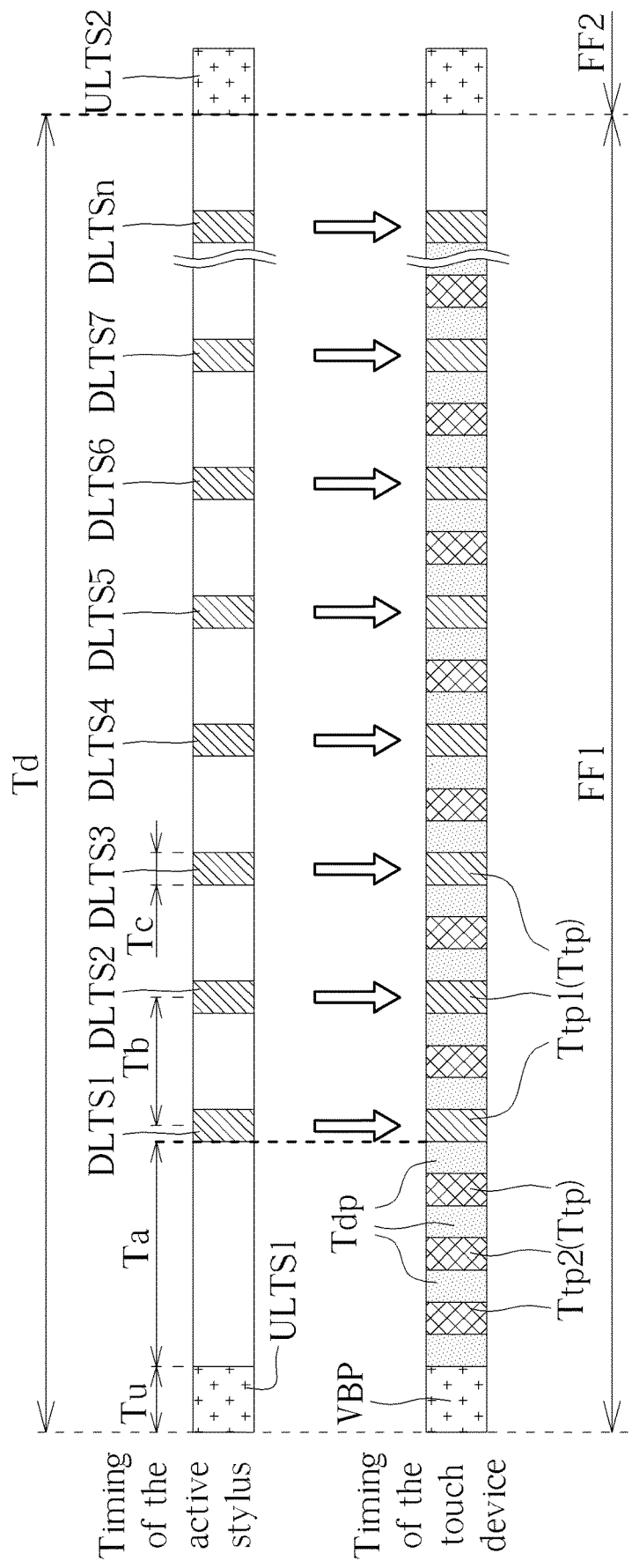
FIG. 2 is a timing chart of an active stylus and a touch device according to an embodiment of the present invention.

For example, FIG. 2 is a timing chart of the active stylus 110 and the touch device 130 according to an embodiment of the present invention.

One frame FF1 for the touch device 130 may be divided into a porch VBP, display period(s) Tdp, and touch period(s) Ttp. The start (or the end) of one frame may be defined according to a vertical sync signal; the display period(s) Tdp and touch period(s) Ttp may be defined according to a horizontal sync signal. According to timing requirements/ configuration, the touch device 130 may perform display operation to display images during display period(s) Tdp, and may perform touch operation to sense a touch input induced by a finger during a touch period Ttp (for instance, the touch period Ttp2) and/or a touch input induced by the active stylus 110 during a touch period Ttp (for instance, the touch period Ttp1).

As shown in FIG. 2, timing parameter(s) of the active stylus 110 may include an uplink time length Tu, an uplink period Td, an uplink-falling-edge-to-downlink-rising-edge time length Ta, a downlink period Tb, a downlink time length Tc, or a downlink slot number n. The timing parameter(s) of the active stylus 110 (and thus the transmission timing of the downlink signal DLS) may be calibrated to meet the timing requirements/configuration of the touch device 130.

The downlink time length Tc may be the length of time for a downlink timeslot DLTS1, DLTS2 . . . or DLTSn, where n is an integer. The active stylus 110 may transmit the downlink signal DLS shown in FIG. 1 to the touch device 130 in the downlink timeslot(s) DLTS1, DLTS2 . . . and/or DLTSn. One touch period Ttp may be equal to or longer than one downlink time length Tc. The downlink time length Tc (and thus the transmission timing for the downlink timeslot(s) DLTS1, DLTS2 . . . or DLTSn) may be adjusted/configured so that each of the downlink timeslots DLTS1 to DLTSn may coincide with one touch period Ttp1. Alternatively, the touch device 130 may adjust/configure the start of the touch operation within one touch period Ttp1. In this manner, the touch device 130 is able to receive the downlink signal DLS from the active stylus 110 in time (or properly) and/or decode the downlink signal DLS correctly.

The uplink-falling-edge-to-downlink-rising-edge time length Ta may start from the end of the uplink timeslot ULTS1 and end at the start of the downlink timeslot DLTS1 (coming after the uplink timeslot ULTS1). The uplink-falling-edge-to-downlink-rising-edge time length Ta (and thus the transmission timing for the downlink timeslot DLTS1) may be adjusted/configured so that the downlink timeslot DLTS1 may overlap/coincide with one touch period Ttp1.

The downlink period Tb may be the time length between two adjacent downlink timeslots (for instance, from the start of the downlink timeslot DLTS1 to the start of DLTS2). The downlink period Tb (and thus the transmission timing for the downlink timeslots DLTS2 to DLTSn) may be adjusted/configured so that each of the downlink timeslots DLTS1 to DLTSn may overlap/coincide with one touch period Ttp1.

The downlink slot number n may be the total number of the downlink timeslots DLTS1 to DLTSn. In FIG. 2, the downlink slot number n may be equal to 8.

The uplink time length Tu may be the length of time for an uplink timeslot ULTS1 or DLTS2. The touch device 130 may transmit the uplink signal ULS shown in FIG. 1 to the active stylus 110 in the uplink timeslot ULTS1 or DLTS2. The uplink timeslot ULTS1 may overlap/coincide with the porch VBP of the frame FF1 for the touch device 130.

The uplink period Td may be the time length between the two adjacent uplink timeslots ULTS1 and ULTS2. The uplink period Td may be equal to the time length of the frame FF1 for the touch device 130 or the reciprocal of the frame rate of the touch device 130. In an embodiment, the touch device 130 may indicate (to the active stylus 110) that the frame rate is 60 hertz (Hz), while the exact frame rate of the touch device 130 may be (slightly) higher/lower than 60 Hz, and hence the uplink period Td is requested to be (slightly) shorter/longer than 16.667 milliseconds (ms). Accordingly, there is a need to make timing calibration (automatically) (in Step S306 detailed below) after the timing parameter(s) of the active stylus 110 for the touch device 130 has/have been (automatically) configured (in Step S304 detailed below). In other words, the uplink period Td (or the transmission timing for the downlink timeslot(s) in a frame FF2) may be adjusted/configured such that each downlink timeslot (for instance, each of the downlink timeslots DLTS1 to DLTSn) may overlap/coincide with one touch period Ttp1.

Figure 3:
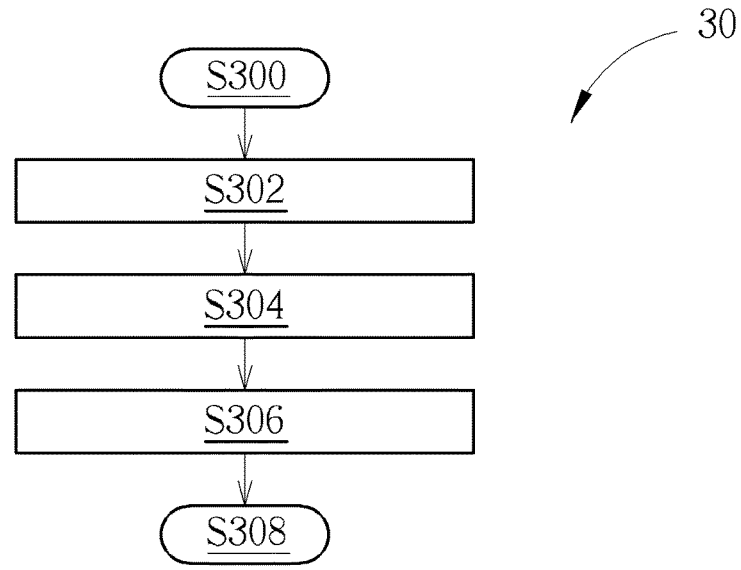
FIGS. 3 and 4 are flowcharts of synchronization methods according to embodiments of the present invention.

FIG. 3 is a flowchart of a synchronization method 30 according to an embodiment of the present invention. The synchronization method 30 between the active stylus 110 and the touch device 130 may include steps as follows:

Step S300: Start.

Step S302: Determine whether the active stylus 110 approaches the touch device 130.

Step S304: Start a timing configuration process in response to a response signal transmitted from the active stylus 110 to the touch device 130.

Step S306: Start a timing calibration process after the timing configuration process is completed.

Step S308: End.

Specifically, after the active stylus 110 touches/hovers over the touch device 130, the timing configuration process (in Step S304) may be triggered. In Step S304, the touch device 130 transmits (information of) the timing parameter(s) to the active stylus 110. Then, the timing calibration process (in Step S306) may be performed. For example, the active stylus 110 may adjust/calibrate the (transmission) timing of the downlink signal DLS to meet timing requirements/configuration of the touch device 130, such that the downlink signal DLS is transmitted from the active stylus 110 to the touch device 130 at the right time. In other word, one active stylus (for instance, the active stylus 110) and one touch device (for instance, the touch device 130) are paired on a case-by-case approach. The timing of one active stylus may be optimized according to the timing of one touch device to be paired with.

Figure 4:
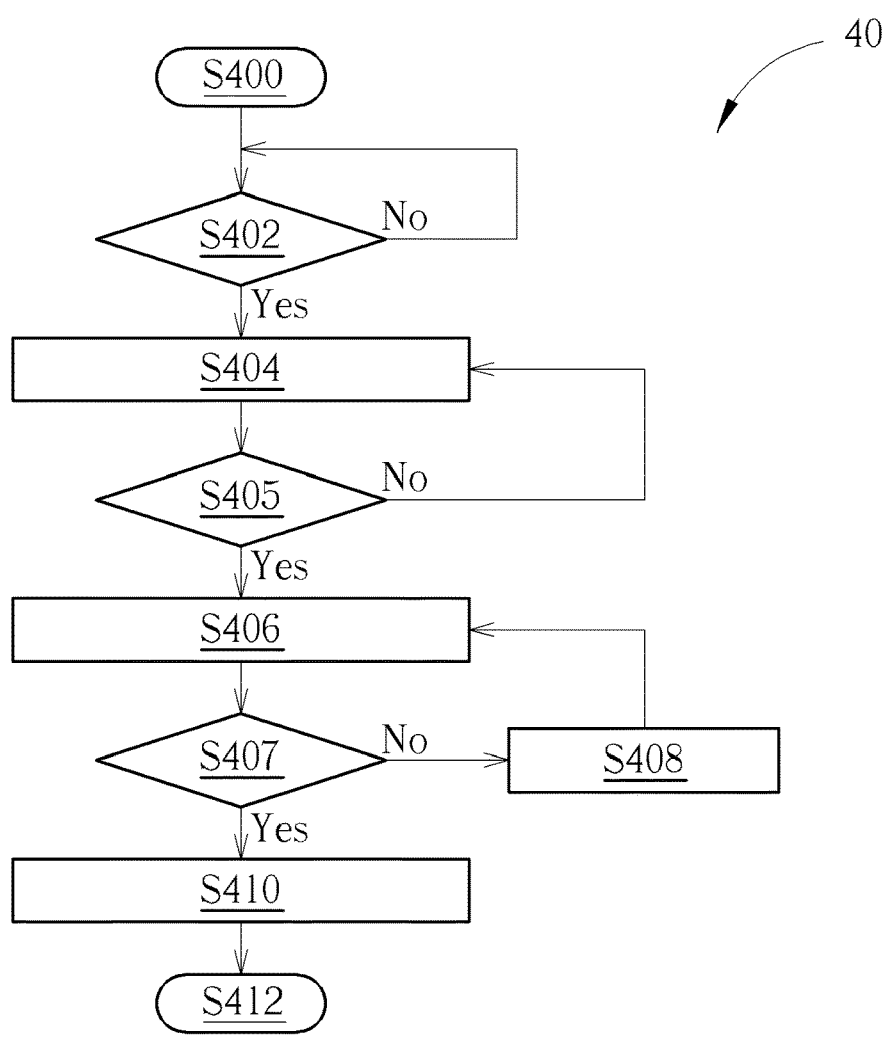

FIG. 4 is a flowchart of a synchronization method 40 for the touch device 130 according to an embodiment of the present invention. The synchronization method 40 for the touch device 130 may include steps as follows:

Step S400: Start.

Step S402: The touch device 130 determines whether the active stylus 110 approaches the touch device 130. If yes, go to Step S404; otherwise, repeat Step S402.

Step S404: The touch device 130 transmits one timing configuration signal to the active stylus 110, wherein the timing configuration signal indicates part of or all of the timing parameter(s).

Step S405: The touch device 130 determines whether all (information of) the timing parameter(s) is/are transmitted to the active stylus 110. If yes, go to Step S406; otherwise, go to Step S404.

Step S406: The touch device 130 receives one calibration downlink signal from the active stylus 110.

Step S407: The touch device 130 determines whether calibration downlink timeslot(s) of the calibration downlink signal coincides/coincide with touch period(s) Ttp1 of the touch device 130. If yes, go to Step S410; otherwise, go to Step S408.

Step S408: The touch device 130 transmits one timing checking-and-adjusting signal to the active stylus 110, wherein the timing checking-and-adjusting signal is configured to instruct the active stylus 110 to shift/adjust calibration downlink timeslot(s) of another calibration downlink signal to be transmitted.

Step S410: The touch device 130 receives one downlink signal from the active stylus 110, wherein downlink timeslot(s) of the downlink signal coincides/coincide with touch period(s) Ttp1 of the touch device 130.

Step S412: End.

Figure 5:
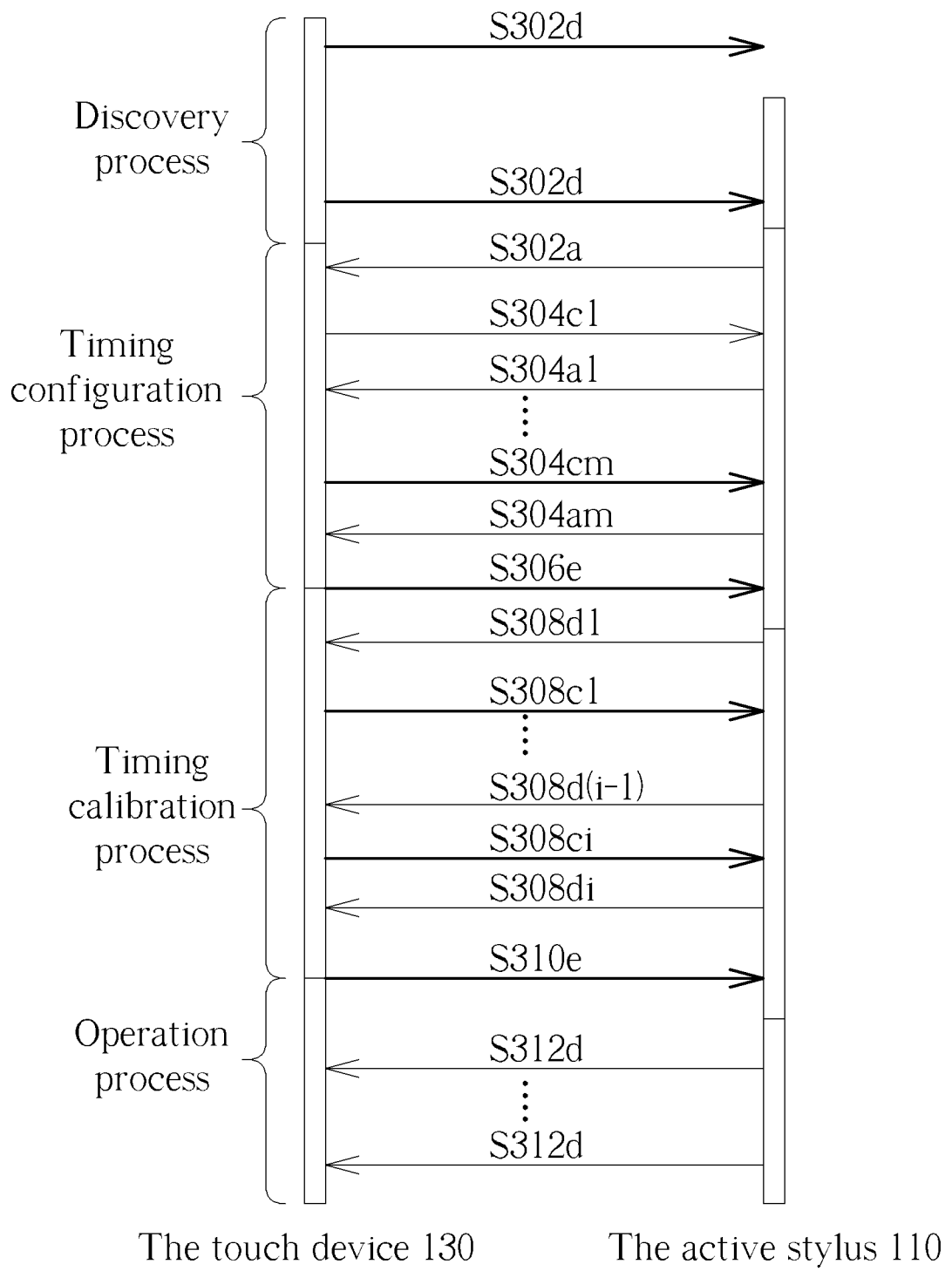
FIG. 5 is a sequence diagram of a synchronization method according to an embodiment of the present invention.

FIG. 5 is a sequence diagram of a synchronization method 50 according to an embodiment of the present invention.

The touch device 130 may notify a stylus (such as the active stylus 110) of the presence of the touch device 130. Specifically, the touch device 130 may transmit a detect signal S302d, which may serve as the uplink signal ULS shown in FIG. 1 but is not limited thereto, many times. The detect signal S302d may include a command to instruct a stylus (such as the active stylus 110) to enter a discovery process, and/or identification information of the touch device 130. After the active stylus 110 detects the (last) detect signal S302d, the active stylus 110 may respond with a response signal S302a, which may be an acknowledgement (ACK).

The touch device 130 may determine that the active stylus 110 touches/hovers over the touch device 130 (in Step S302 or S402) and initiate a timing configuration process (in Step S304) after the touch device 130 receives the response signal S302a.

In one embodiment, the touch device 130 may send the timing configuration signals S304c1 to S304cm, which may serve as the uplink signals ULS shown in FIG. 1 respectively but are not limited thereto, to indicate (preliminary/uncalibrated) timing parameter(s) for the touch device 130 in the timing configuration process (in Step S404), where m is an integer. Specifically, the touch device 130 may split a timing configuration data into timing configuration signals S304c1 to S304cm (for instance, according to bandwidth of uplink transmission). Each of the timing configuration signals S304c1 to S304cm may carry a smaller number of bits of information, while the timing parameter(s) may be represented by a larger number of bits. Consequently, each of the timing configuration signals S304c1 to S304cm may specify a portion of the timing parameter(s): for example, the timing configuration signals S304c1 may include information of the downlink time length Tc, and the timing configuration signals S304c2 may include information of the uplink period Td. The active stylus 110 may receive the timing configuration signals S304c1 to S304cm one by one to integrate all of the timing configuration signals S304c1 to S304cm back into the timing configuration data corresponding to all the timing parameter(s). In another embodiment, the touch device 130 may send merely one timing configuration signal (corresponding to the timing configuration data) to indicate all the timing parameter(s) for the touch device 130 in the timing configuration process (in Step S404) (if the bandwidth is high enough or the amount of the timing configuration data is relatively small). Therefore, the active stylus 110 may receive the timing configuration data at a time.

After the active stylus 110 receives any of the timing configuration signals S304c1 to S304cm, the active stylus 110 may respond with an acknowledgement (namely, one of acknowledgements S304a1 to S304am). The active stylus 110 may transmit one of the acknowledgements S304a1 to S304am (or the response signal S302a) at a time point designated by the corresponding timing configuration signal (or the detect signal S302d). The time point may be designated by using a command in the corresponding timing configuration signal (or the detect signal S302d). Alternatively, the active stylus 110 may send one of the acknowledgements S304a1 to S304am (or the response signal S302a) for a long time. Once the touch device 130 has detected a signal, the touch device 130 regards the signal as the acknowledgement (or the response signal S302a).

After the active stylus 110 receives all the timing parameter(s) (or more specifically, the touch device 130 receives the last acknowledgement S304am), the touch device 130 may determine that all the timing parameter(s) is/are transmitted to the active stylus 110 (in Step S405) and send a timing configuration end signal S306e, which may serve as the uplink signal ULS shown in FIG. 1 but is not limited thereto, to the touch device 130 to finish the timing configuration process (or a timing pairing mode/state).

The system 10 starts a timing calibration process (in Step S306) to calibrate a (calibration) downlink signal against the touch periods of the touch device 130 such that one (calibration) downlink timeslot (for instance, any of calibration downlink timeslots iDLTS1 to iDLTSn detailed below or the downlink timeslots DLTS1 to DLTSn shown in FIG. 2) eventually overlaps/coincides with one touch period (for instance, the corresponding touch period Ttp1 shown in FIG. 2).

Figure 6:
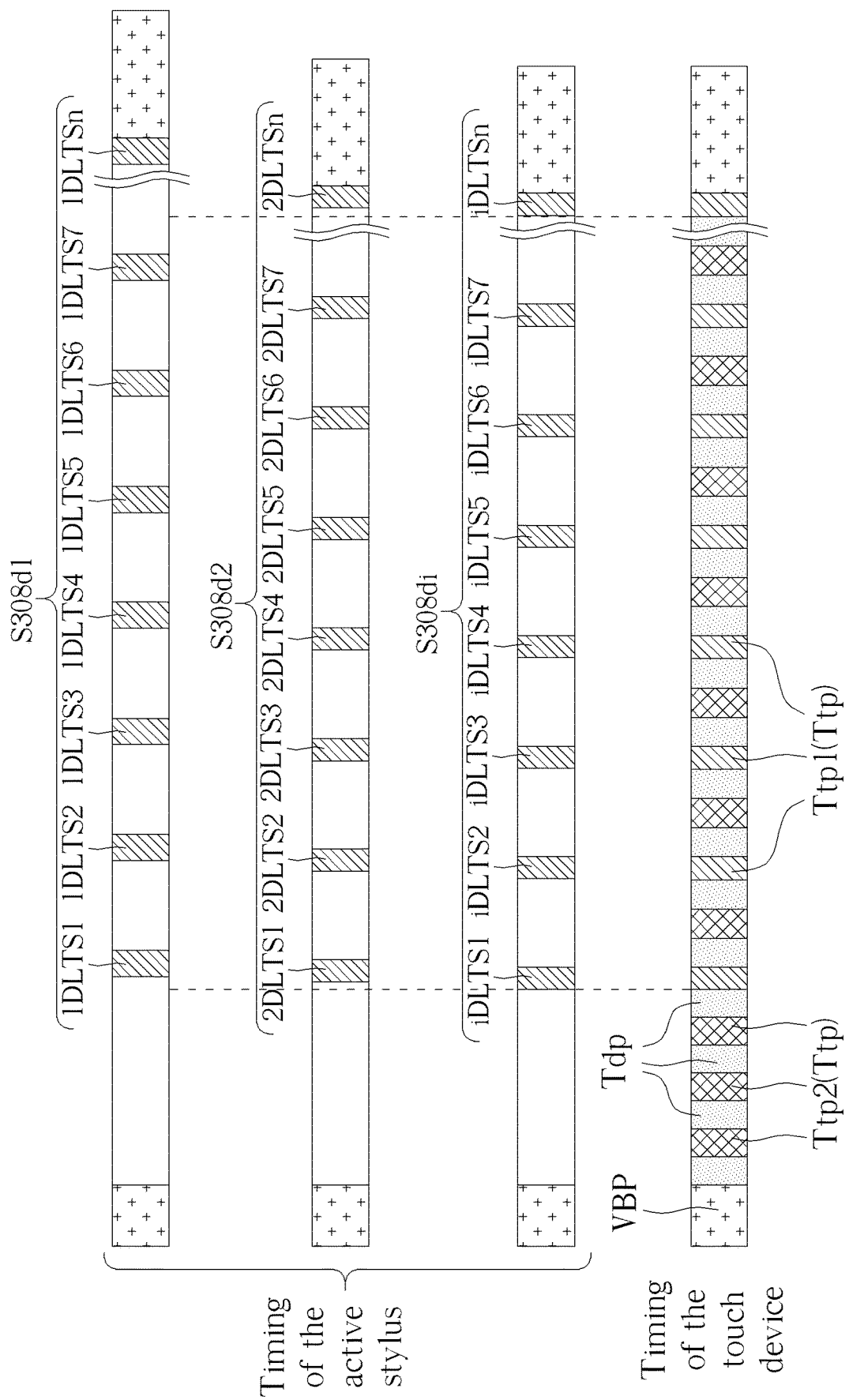
FIG. 6 is a timing chart of an active stylus and a touch device according to an embodiment of the present invention.

Specifically, please refer to FIG. 5 and FIG. 6, which is a timing chart of the active stylus 110 and the touch device 130 according to an embodiment of the present invention. The active stylus 110 may transmit calibration downlink signals S308d1 to S308di (or merely one calibration downlink signal if it is enough), which may serve as the downlink signal DLS shown in FIG. 1 respectively but is not limited thereto, to the touch device 130, where i is an integer.

As shown in FIG. 6, the calibration downlink timeslots iDLTS1 to iDLTSn of the calibration downlink signal S308di coincides/coincide with the touch periods Ttp1 of the touch device 130. However, at least one calibration downlink timeslot of the calibration downlink signals S308d1 to S308d(i−1) (for instance, calibration downlink timeslots 1DLTS1 to 1DLTSn of the calibration downlink signal S308d1 and calibration downlink timeslots 2DLTS1 to 2DLTSn of the calibration downlink signal S308d2) is shifted away from the corresponding touch period(s) Ttp1 of the touch device 130 in time domain. As shown in FIG. 6, the downlink time lengths of the calibration downlink timeslots 1DLTS1 to 1DLTSn of the calibration downlink signal S308d1 may be unequal to the downlink time lengths of the calibration downlink timeslots iDLTS1 to iDLTSn of the calibration downlink signal S308di. As shown in FIG. 6, the downlink time lengths of the calibration downlink timeslots 2DLTS1 to 2DLTSn of the calibration downlink signal S308d2 may be equal to the calibration downlink time lengths of the downlink timeslots iDLTS1 to iDLTSn of the calibration downlink signal S308di. The waveform within one calibration downlink timeslot of one of the calibration downlink signals S308d1 to S308di may be identical to the waveform within the corresponding calibration downlink timeslot of another of the calibration downlink signals S308d1 to S308di.

After the touch device 130 receives the calibration downlink signal S308d1 (in Step S406), the touch device 130 may determine whether the calibration downlink timeslots 1DLTS1 to 1DLTSn of the calibration downlink signal S308d1 coincides/coincide with touch periods Ttp1 of the touch device 130 (in Step S407). In one embodiment, the touch device 130 may decode the calibration downlink signal S308d1 to generate a decoding result. The touch device 130 may check whether the (transmission) timing of the calibration downlink signal S308d1 is calibrated according to the correctness of the decoding result of the calibration downlink signal S308d1 and/or the signal strength of the carrier of the calibration downlink signal S308d1. For example, the touch device 130 may measure the waveform of the downlink signal S308d1, and determine, for instance, whether each of the downlink timeslots 1DLTS1 to 1DLTSn of the calibration downlink signal S308d1 overlaps/coincides with one touch period Ttp1.

If the (transmission) timing of the calibration downlink signal S308d1 has not been calibrated yet (for instance, at least one of the calibration downlink timeslots 1DLTS1 to 1DLTSn of the calibration downlink signal S308d1 is shifted away from the corresponding touch period(s) Ttp1 of the touch device 130), the touch device 130 may transmit a timing checking-and-adjusting signal S308c1, which may serve as the uplink signal ULS shown in FIG. 1 but is not limited thereto, (in Step S408) to instruct the active stylus 110 to shift/adjust at least one of the calibration downlink timeslots 2DLTS1 to 2DLTSn of the calibration downlink signal S308d2 to be transmitted. For example, the active stylus 110 may shift the downlink timeslot 1DLTS1, 1DLTS2 . . . or 1DLTSn of the calibration downlink signal S308d1 so as to make all the downlink timeslots iDLTS1 to iDLTSn of the calibration downlink signal S308di eventually overlap/coincide with the corresponding touch periods Ttp1. Alternatively, the active stylus 110 may adjust the (current) timing parameter(s) of the active stylus 110 (for example, decrease/increase the downlink time length, the uplink-falling-edge-to-downlink-rising-edge time length, the downlink period, or the uplink period of the calibration downlink signal S308d1) so as to make all the downlink timeslots iDLTS1 to iDLTSn of the calibration downlink signal S308di eventually overlap/coincide with the corresponding touch periods Ttp1.

In response to the timing checking-and-adjusting signal S308c1, the active stylus 110 may then transmit the calibration downlink signal S308d2 to the touch device 130. After the touch device 130 receives the calibration downlink signal S308d2 (in Step S406), the touch device 130 may go through Step S407, S408 again. In fact, the (transmission) timing of the active stylus 110 may be adjusted repeatedly/iteratively until the calibration downlink signal S308di having all its calibration downlink timeslots 1DLTS1 to 1DLTSn coinciding with the touch periods Ttp1.

After the touch device 130 determines that calibration downlink timeslots iDLTS1 to iDLTSn of the last calibration downlink signal S308di, which is transmitted according to the (calibrated/optimum) timing parameter(s), coincide with touch periods Ttp1 of the touch device 130, the touch device 130 may transmit a timing calibration end signal S310e, which may serve as the uplink signal ULS shown in FIG. 1 but is not limited thereto, to the active stylus 110 to finish the timing calibration process.

After the timing calibration process is completed, the active stylus 110 may enter/return to an operation process in Step S410. Specifically, the active stylus 110 may transmit (operation) downlink signal(s) S312d, which may serve as the downlink signal DLS shown in FIG. 1 but is not limited thereto, according to the (calibrated/optimum) timing parameter(s) of the active stylus 110 for the touch device 130 in Step S410. The downlink timeslot(s) (for instance, the downlink timeslots DLTS1 to DLTSn shown in FIG. 2) of the downlink signal(s) S312d coincide with the touch period(s) (for instance, the touch periods Ttp1 shown in FIG. 2) of the touch device 130. In the operation process, a user may use the active stylus 110 to write, mark up, and draw. Each (operation) downlink signal S312d may include information such as an on/off operation of a button of the active stylus 110, how much charge the active stylus 110 has left, stylus pressure, stylus tone, stylus tilt, a brush type, or stylus identification (ID) depending on an operation state of the active stylus 110, but not limited thereto. In other words, the active stylus 110 may manipulate/control the display presented on the touch device 130.

It is noteworthy that the touch device 130 is able to receive the downlink signal(s) S312d from the active stylus 110 in time (or properly) and/or decode the downlink signal(s) S312d correctly in Step S410 because of the timing calibration process in Step S306 or Step S406 to S408.

Table 1 is an uplink protocol description of a format for a timing configuration signal (for instance, the timing configuration signal S304c1 shown in FIG. 5) according to an embodiment of the present invention. The timing configuration signal may include a preamble field, a data field, and/or a cyclic redundancy check (CRC) field. The preamble field or the data field may be represented by X bits, where X is an integer.

TABLE 1

| Preamble field | Data field | CRC field |
| --- | --- | --- |

Figure 7:
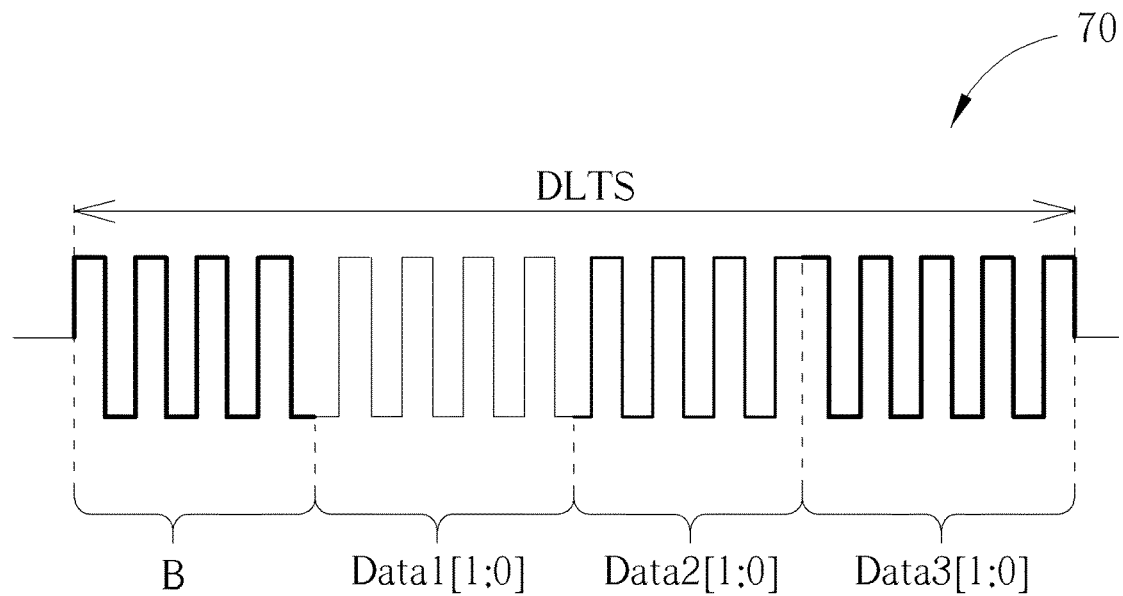
FIG. 7 is a downlink modulation format of a data signal according to an embodiment of the present invention.

FIG. 7 is a downlink modulation format of a data signal 70 according to an embodiment of the present invention. A downlink signal (for instance, one of the calibration downlink signals S308d1 to S308di in FIG. 5 or the downlink signal DLS in FIG. 1) may include the data signal 70, which is scheduled to be transmitted in one downlink timeslot DLTS (for instance, any of the downlink timeslot DLTS1 to DLTSn in FIG. 2 or the calibration downlink timeslot 1DLTS1 to iDLTSn in FIG. 6). As shown in FIG. 7, the data signal 70 may be modulated by DQPSK (Differential Quadrature Phase Shift Keying), but is not limited thereto. The data signal 70 may be demodulated by DQPSK to include a base symbol B and three symbols Data1[1:0], Data2[1:0], and/or Data3[1:0], each representing 2-bit data. Each 2-bit data may be expressed by a quadrature phase shift from the base symbol B. The symbols Data1[1:0], Data2[1:0], and/or Data3[1:0] may be "10", "00", and "01" in binary, and cause phase shifts of 90, 180, and 270 degrees respectively.

The data signal 70 may play a role on the timing calibration process (in Step S306 or S407). If the (transmission) timing of the active stylus 110 for the touch device 130 is calibrated (so that, for example, each of the calibration downlink timeslots iDLTS1 to iDLTSn of the calibration downlink signal S308di overlaps/coincides with one touch period Ttp1), the data signal 70 may be demodulated/decoded correctly by the touch device 130. Whether the (transmission) timing of the active stylus 110 is calibrated to meet the timing requirements/configuration of the touch device 130 may be determined by examining/determining whether the data signal 70 after demodulation is correct or not.

To achieve timing calibration (in Step S306 or S407), the touch device 130 may analyze the data signal 70 to extract raw-data related to the signal strength of the carrier of the data signal 70 (or the corresponding calibration downlink signal). If the (transmission) timing of the active stylus 110 for the touch device 130 is calibrated (so that, for example, each of the calibration downlink timeslots iDLTS1 to iDLTSn of the calibration downlink signal S308di overlaps/coincides with one touch period Ttp1), the raw-data may be demodulated correctly by the touch device 130. Whether the (transmission) timing of the active stylus 110 is calibrated to meet the timing requirements/configuration of the touch device 130 may be determined by examining/determining whether the raw-data after demodulation is qualified or not.

In a word, the touch device 130 may check whether the (transmission) timing of the active stylus 110 is calibrated according to the correctness of the decoding result of the data signal 70 (or the corresponding calibration downlink signal) and/or the signal strength of the carrier of the data signal 70 (or the corresponding calibration downlink signal) as detailed in Step S306 or S407.

Figure 8:
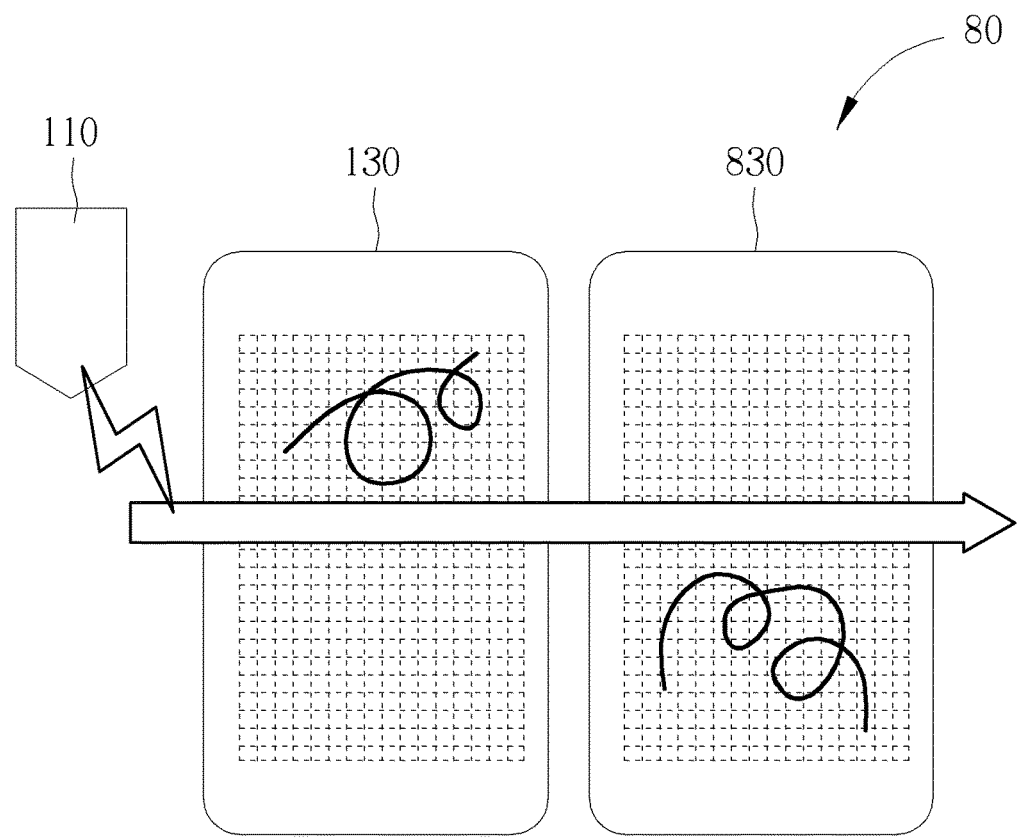
FIG. 8 is a schematic diagram of cross-platform system according to an embodiment of the present invention.

FIG. 8 is a schematic diagram of cross-platform system 80 according to an embodiment of the present invention. As shown in FIG. 8, the active stylus 110 may move from one touch device (for instance, the touch device 130) to another touch device (for instance, a touch device 830). The (calibrated/optimum) transmission timing for the touch device 130 may be different from the (calibrated/optimum) transmission timing for the touch device 830. The active stylus 110 may transmit (operation) downlink signal(s) in the operation process to the touch device 130 according to the (calibrated/optimum) timing parameter(s) for the touch device 130 and transmit (operation) downlink signal(s) in the operation process to the touch device 830 according to the (calibrated/optimum) timing parameter(s) for the touch device 830. In other words, the active stylus 110 is able to communicate to different touch devices and may communicate to different touch devices alternately.

The (transmission) timing for the touch device 130 (such as the calibrated/optimum timing parameter(s) of the active stylus 110 for the touch device 130) may be stored in a timing table 130T (after a timing calibration process such as S306 or S407); the (transmission) timing for the touch device 130 (such as the calibrated/optimum timing parameter(s) of the active stylus 110 for the touch device 830) may be stored in a timing table 830T (after another timing calibration process such as S306 or S407). In an embodiment, timing table(s) (for example, the timing tables 130T and 830T) may be stored in the active stylus 110. In this case, the active stylus 110 may instruct/trigger (a controller of) a touch device (for example, the touch device 130 or 830) to send an uplink signal, which is configured to indicate which timing table the active stylus 110 should select, to the active stylus 110 after the active stylus 110 touches/hovers over the touch device and is to be operated in the operation process. In another embodiment, timing table(s) (for example, the timing tables 130T and 830T) may be stored in the touch device 130 or 830 (for instance, a microcontroller (MCU) or a controller of a touch-and-display-driver-integrated-circuit (TDDI) of the touch device 130). In this case, the touch device 130 (or 830) may send an uplink signal, which is configured to indicate the (transmission) timing of the active stylus 110 for the touch device130 (or 830), to the active stylus 110 after the active stylus 110 touches/hovers over the touch device130 (or 830) and is to be operated in the operation process.

Figure 9:
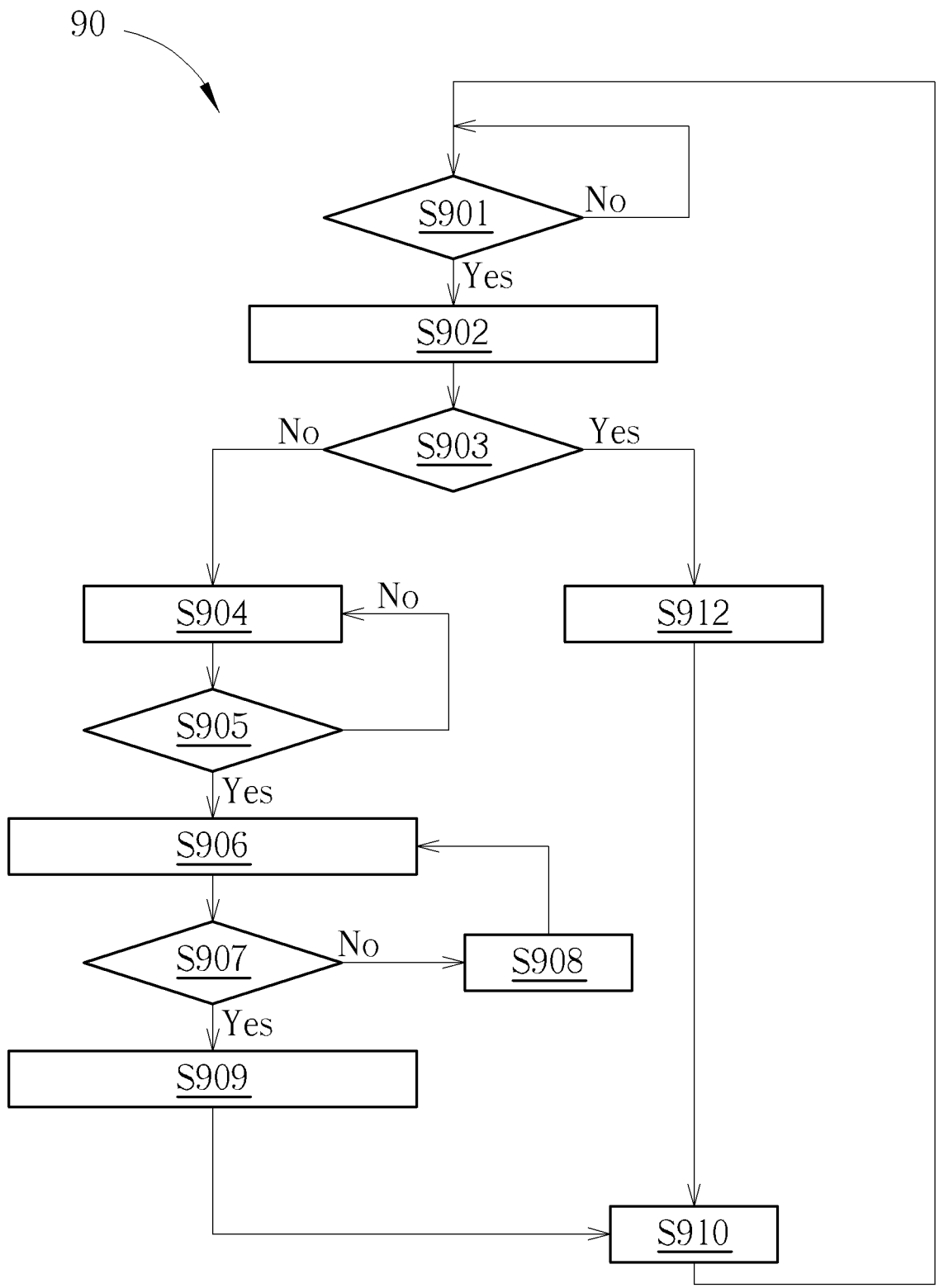
FIG. 9 is a flowchart of a synchronization method according to an embodiment of the present invention.

FIG. 9 is a flowchart of a synchronization method 90 according to an embodiment of the present invention. The synchronization method 90 between the active stylus 110 and a touch device (for example, the touch device 130 or 830) may include steps as follows:

Step S901: The touch device 130 (or 830) determines whether the active stylus 110 approaches the touch device 130 (or 830). If yes, go to Step S902; otherwise, repeat Step S901.

Step S902: The active stylus 110 receives an uplink signal from the touch device 130 (or 830).

Step S903: The active stylus 110 determines whether the active stylus 110 is paired with the touch device 130 (or 830). If yes, go to Step S912; otherwise, go to Step S904.

Step S904: The touch device 130 (or 830) transmits one timing configuration signal to the active stylus 110, wherein the timing configuration signal indicates part of or all of the timing parameter(s).

Step S905: The touch device 130 (or 830) determines whether all (information of) the timing parameter(s) is/are transmitted to the active stylus 110. If yes, go to Step 906; otherwise, go to Step S904.

Step S906: The touch device 130 (or 830) receives one calibration downlink signal from the active stylus 110.

Step S907: The touch device 130 (or 830) determines whether calibration downlink timeslot(s) of the calibration downlink signal coincides/coincide with touch period(s) Ttp1 of the touch device 130 (or 830). If yes, go to Step S909; otherwise, go to Step S908.

Step S908: The touch device 130 (or 830) transmits one timing checking-and-adjusting signal to the active stylus 110, wherein the timing checking-and-adjusting signal is configured to instruct the active stylus 110 to shift/adjust calibration downlink timeslot(s) of another calibration downlink signal to be transmitted.

Step S909: The active stylus 110 saves the (transmission) timing for the touch device 130 (or 830) in a timing table.

Step S910: The touch device 130 (or 830) receives one downlink signal from the active stylus 110, wherein downlink timeslot(s) of the downlink signal coincides/coincide with touch period(s) Ttp1 of the touch device 130 (or 830).

Step S912: The active stylus 110 configures the timing table.

The synchronization method 90 may be detailed as follows. In an embodiment, Step S901 may correspond to Step S302 or S402.

In an embodiment, the touch device 130 (or 830) may send an uplink signal, which is related to which (calibrated/optimum) timing parameter(s) the active stylus 110 should configure or which touch device the active stylus 110 is to be paired with, in Step S902. For example, the uplink signal may be configured to indicate to the active stylus 110 which timing table the active stylus 110 should select. Alternatively, the uplink signal may be configured to indicate the (transmission) timing of the active stylus 110 for the touch device 130 (or 830). Alternatively, the uplink signal may be configured to ensure that the downlink timeslots (for instance, the downlink timeslots DLTS1 to DLTSn shown in FIG. 2) of a downlink signal coincide with the touch periods (for instance, the touch periods Ttp1 shown in FIG. 2) of the touch device 130 (or 830). In another embodiment, the uplink signal may be the detect signal S302d shown in FIG. 5. In another embodiment, the active stylus 110 may transmit the response signal S302a shown in FIG. 5 so as to trigger the touch device 130 (or 830) to send the uplink signal. In another embodiment, the active stylus 110 may transmit an instruction signal so as to instruct the touch device 130 (or 830) to send the uplink signal in Step S902.

In Step S903, the active stylus 110 may determine whether the active stylus 110 is paired with (or calibrated against) the touch device 130 (or 830). For example, the active stylus 110 may search for a timing table, which includes the (calibrated/optimum) transmission timing configured for the active stylus 110 to transmit operation downlink signal(s) to the touch device 130 (or 830) properly after the active stylus 110 receives the uplink signal. If the active stylus 110 is able to find/configure the timing table for the touch device 130 (or 830), the active stylus 110 is calibrated against the touch device 130 (or 830). Otherwise, the active stylus 110 and the touch device 130 (or 830) fail to pair up. Alternatively, if the (transmission) timing of the downlink signal from the active stylus 110 meets the timing requirements/configuration of the touch device 130 (or 830), the active stylus 110 is calibrated against the touch device 130 (or 830).

If the active stylus 110 fails to be paired with the touch device 130 or 830 (for example, the active stylus 110 is unable to find the timing table indicated by the touch device 130 or 830), the active stylus 110 and the touch device 130 (or 830) may go through Steps S904 to S908 to make timing configuration/calibration. Steps S904 to S908 may correspond to Steps S404 to S408. Afterwards, each of the downlink timeslots DLTS1 to DLTSn shown in FIG. 2 is able to overlap/coincide with one touch period Ttp1.

Then, in Step S909, the active stylus 110 may save/store the transmission timing (such as the calibrated/optimum timing parameter(s) of the active stylus 110) for the touch device 130 (or 830) in another timing table according to the results of the timing calibration process (in Steps S906 to S908). The active stylus 110 may be operated in the operation process (namely, Step S910 or S410) according to information in the timing table.

If the active stylus 110 has been calibrated against the touch device 130 (or 830), the active stylus 110, in Step S912, may load/select/configure the corresponding timing table, which may include the transmission timing (such as calibrated/optimum timing parameter(s)) for the touch device 130 (or 830). As a result, each of the downlink timeslots DLTS1 to DLTSn shown in FIG. 2 is able to overlap/coincide with one touch period Ttp1. The active stylus 110 may be operated in the operation process (namely, Step S910 or S410) according to information in the timing table. In other words, if the active stylus 110 moves out of and then moves back into the detection range of the touch device 130 (or 830), the active stylus 110 may resume the operation process without performing the timing configuration process (in Steps S904 to S905) and timing calibration process (in Steps S906 to S908) again.

Since the active stylus 110 may move from the touch device 130 to the touch device 830, the touch device 830 may perform the synchronization method 90 after the touch device 130 has performed the synchronization method 90 for a while. Specifically, the touch device 130 may go through Steps S901 to S910 (or Steps S901 to S903, S912, and S910). Subsequently, the touch device 830 may go through Steps S901 to S910 (or Steps S901 to S903, S912, and S910). That is to say, the active stylus 110 is able to be operated in the operation process along with the touch device 130 and/or 830. The active stylus 110 may transmit (operation) downlink signal(s) in the operation process to the touch device 130 according to the (calibrated/optimum) timing parameter(s) for the touch device 130 and transmit (operation) downlink signal(s) in the operation process to the touch device 830 according to the (calibrated/optimum) timing parameter(s) for the touch device 830.

Figure 10:
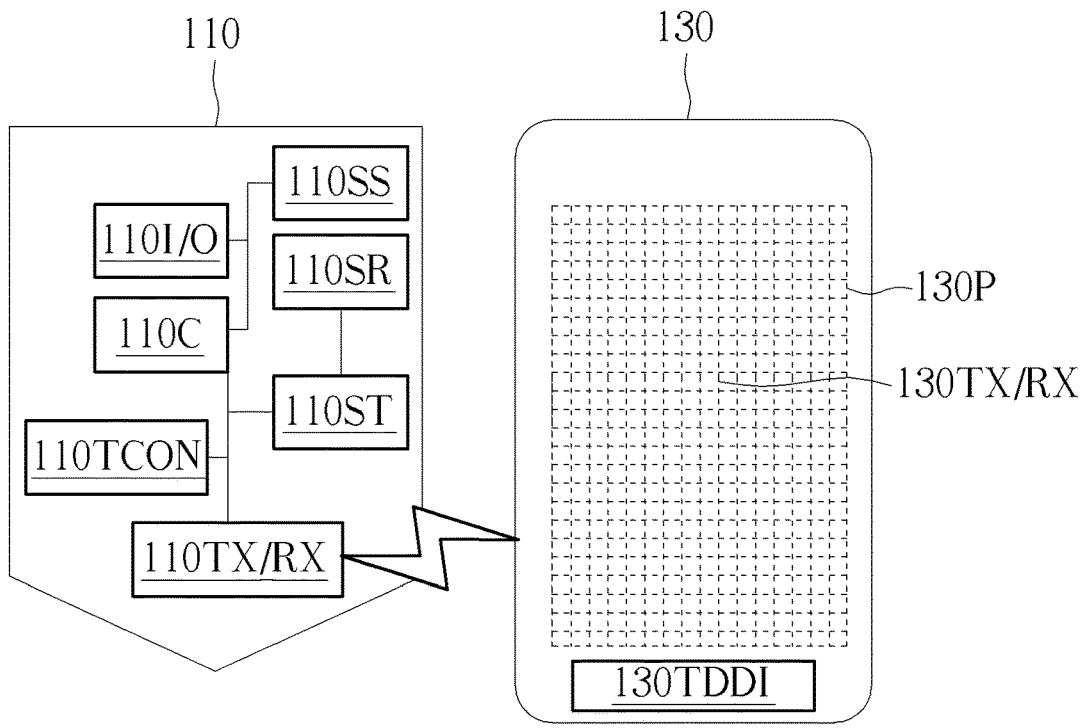
FIG. 10 is a schematic diagram of uplink/downlink transmission between an active stylus and a touch device according to an embodiment of the present invention.
Figure 11:
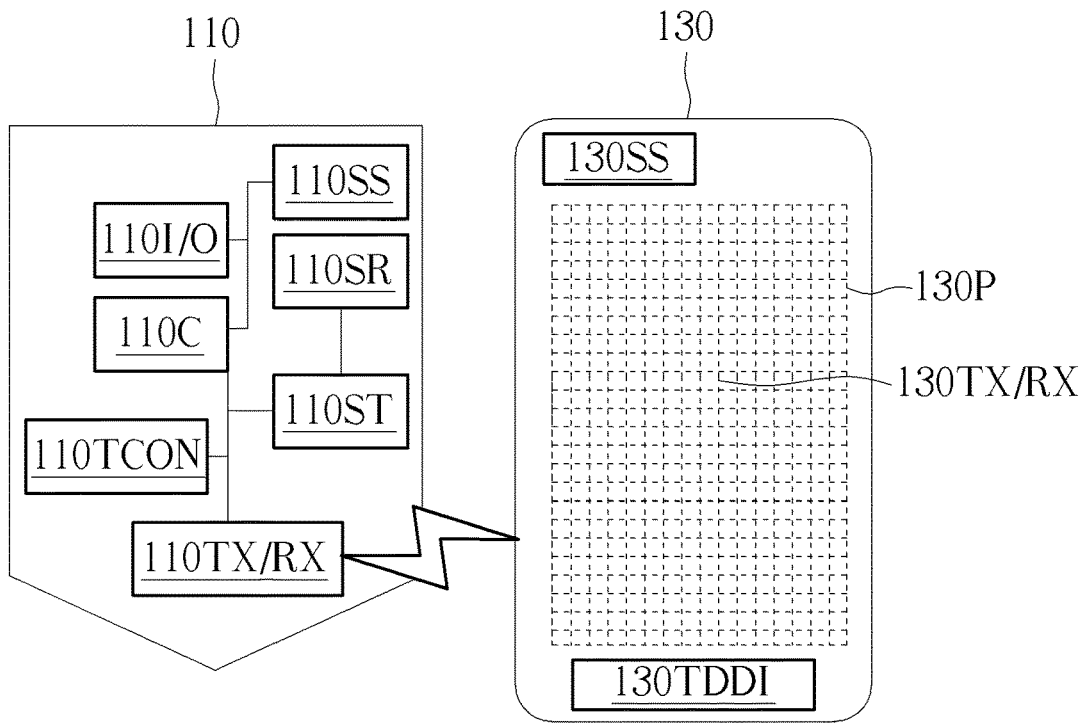
FIG. 11 is a schematic diagram of wireless communication between an active stylus and a touch device according to an embodiment of the present invention.
Figure 12:
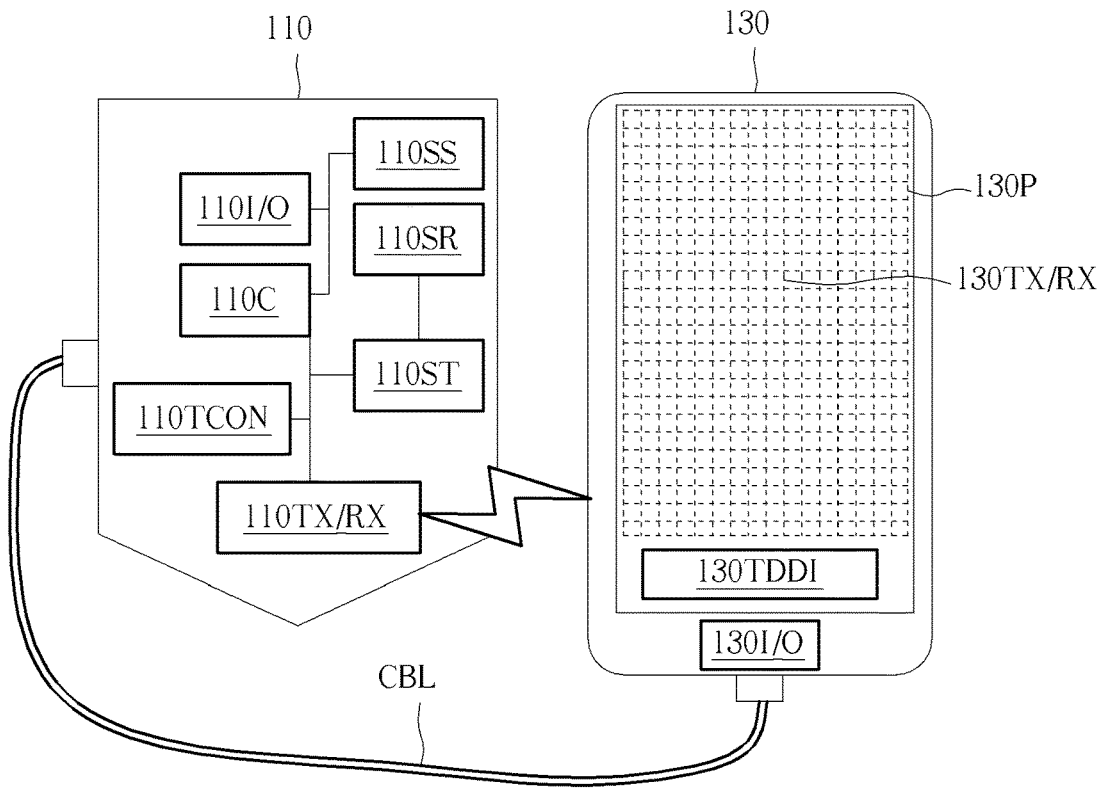
FIG. 12 is a schematic diagram of cable communication between an active stylus and a touch device according to an embodiment of the present invention.

The communication between the touch device 130 (or 830) and the active stylus 110 may be implemented in various manners. For example, FIG. 10 is a schematic diagram of uplink/downlink transmission between the touch device 130 and the active stylus 110 according to an embodiment of the present invention. FIG. 11 is a schematic diagram of wireless communication between the touch device 130 and the active stylus 110 according to an embodiment of the present invention. FIG. 12 is a schematic diagram of cable communication between the touch device 130 and the active stylus 110 according to an embodiment of the present invention.

In FIGS. 10 to 12, the active stylus 110 may include a transceiver 110TX/RX, an input/output (I/O) interface 110I/O, a wireless communication circuit 110SS (which may support wireless communication technologies such as Bluetooth (BT), Wi-Fi, or near-field communication (NFC)), a controller 110C, a timing controller (TCON) 110TCON, a storage circuit 110ST (configured to store data), and/or a sensor 110SR. The active stylus 110 may be a stylus of active capacitive type, but is not limited thereto.

In FIGS. 10 to 12, the touch device 130 may include a touch panel 130P with touch sensors 130TX/RX, an input/output interface 130I/O, a wireless communication circuit 130SS (which may support wireless communication technologies such as BT, Wi-Fi, or NFC), and/or a touch-and-display-driver-integrated-circuit 130TDDI. The touch device 130 may a mobile phone, a tablet, or a laptop, but is not limited thereto.

In FIG. 10, to perform the synchronization method 30, 40, or 90, the active stylus 110 may touch/hover over the touch device 130, such that signals may be transmitted between the transceiver 110TX/RX of the active stylus 110 and the touch panel 130P of the touch device 130. For example, the touch device 130 may transmit the detect signal S302d repeatedly or periodically through the touch sensor(s) 130TX/RX.

In FIG. 11 or 12, to perform the synchronization method 30, 40, or 90, the active stylus 110 may touch/hover over the touch device 130 as well. In an embodiment, the calibration downlink signals S308d1 to S308di (or the downlink signal(s) S312d) shown in FIG. 5 may be transmitted through the transceiver 110TX/RX of the active stylus 110 to the touch panel 130P of the touch device. In an embodiment, the detect signal(s) S302d, the response signal S302a, the timing configuration signals S304c1 to S304cm, the acknowledgements S304a1 to S304am, the timing configuration end signal S306e, the timing checking-and-adjusting signals S308c1 to S308ci, and/or the timing calibration end signal S310e shown in FIG. 5 may be transmitted through wireless communication technologies or a cable CBL connected between the input/output interface 110I/O of the active stylus 110 and the input/output interface 130I/O of the touch device 130, and thus may be transmitted faster than those transmitted through the transceiver 110TX/RX of the active stylus 110. The touch device 130 may transmit the detect signal(s) S302d through the touch sensor(s) 130TX/RX, the input/output interface 110I/O, or the wireless communication circuit 130SS (immediately) after the touch device 130 finds the active stylus 110 using wireless communication technologies or the cable CBL.

In a word, the detect signal(s) S302d, the response signal S302a, the timing configuration signals S304c1 to S304cm, the acknowledgements S304a1 to S304am, the timing configuration end signal S306e, the calibration downlink signals S308d1 to S308di, the timing checking-and-adjusting signals S308c1 to S308ci, or the timing calibration end signal S310e may be transmitted by using wireless communication technologies, the cable CBL, or the touch panel 130P of the touch device 130.

Figure 13:
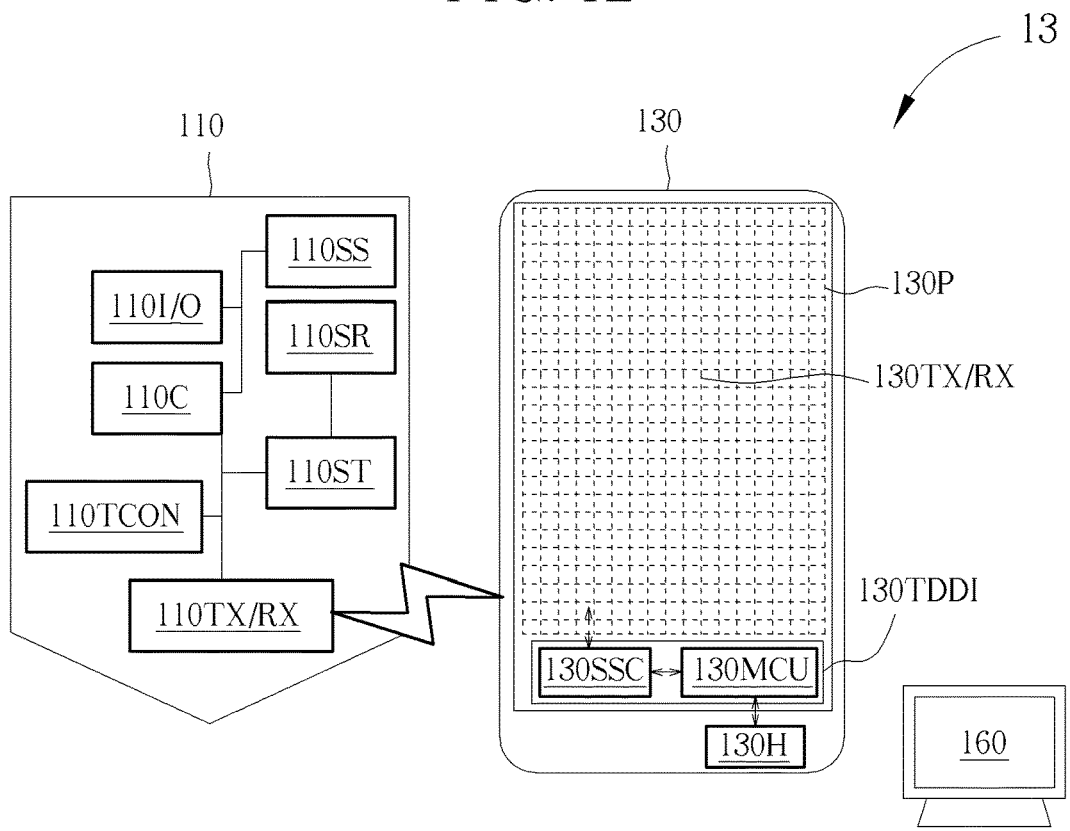
FIG. 13 is a schematic diagram of a system according to an embodiment of the present invention.

The synchronization method 30, 40, or 90 may be performed in various manners. For example, FIG. 13 is a schematic diagram of a system 13 according to an embodiment of the present invention. As shown in FIG. 13, the system 13 may include the active stylus 110, the touch device 130, and an external computing device 160. The touch device 130 may include a host processor 130H and the touch-and-display-driver-integrated-circuit 130TDDI. The touch-and-display-driver-integrated-circuit 130TDDI of the touch device 130 may include a controller 130MCU, which may be a microcontroller, and a sensor sensing circuit 130SSC. The synchronization method 30, 40, or 90 may be controlled by the controller 130MCU, the host processor 130H, or the external computing device 160.

In other words, the timing calibration process may be triggered/initiated by the touch-and-display-driver-integrated-circuit 130TDDI, by the application processor of the touch device130, or by the external computing device160. The timing calibration process may be triggered/initiated according to a start signal sent into the input/output interface 110I/O of the active stylus 110 via the cable CBL.

The touch device 130 (or 830) may correspond to a platform, which is defined by which kind of application processor the touch device 130 includes and/or by which kind of touch panel 130P the touch device 130 includes. For example, the platform corresponding to the touch device 130 and the platform corresponding to the touch device 830 are different because the application processor of the touch device 130 (or the resolution of the touch panel 130P) differs from that of the touch device 830.

In summary, a timing configuration process may be initiated after an active stylus approaches a touch device. A timing calibration process starts after the timing configuration process is completed. Accordingly, the transmission timing of a downlink signal is calibrated to meet timing requirements of the touch device, such that the touch device is able to receive a downlink signal accurately/completely. When the active stylus moves from one touch device to another, the transmission timing of the active stylus may change to meet the timing requirements of both the touch devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronization method, comprising:
    determining, by a first touch device, whether an active stylus approaches the first touch device;
    starting a timing configuration process after the first touch device receives a response signal from the active stylus; and
    starting a timing calibration process after the timing configuration process is completed, wherein the timing calibration process comprises transmitting, by the active stylus, a first calibration downlink signal according to a first timing parameter,
    wherein the first timing parameter is categorized as one of an uplink time length, an uplink period, an edge-to-edge time length, a downlink period, a downlink time length, or a downlink slot number,
    wherein the first timing parameter has been adjusted or is to be adjusted.

2. The synchronization method of claim 1, wherein the timing calibration process further comprises:
    the active stylus transmitting a second calibration downlink signal,
    wherein at least one first calibration downlink timeslot of the first calibration downlink signal is shifted away from at least one touch period of the first touch device respectively in time domain,
    wherein at least one second calibration downlink timeslot of the second calibration downlink signal coincides with the at least one touch period respectively,
    wherein at least one first waveform within the at least one first calibration downlink timeslot of the first calibration downlink signal is respectively identical to at least one second waveform within at least one second calibration downlink timeslot of the second calibration downlink signal.

3. The synchronization method of claim 1,
    wherein at least one first calibration downlink timeslot of the first calibration downlink signal is shifted away from at least one touch period of the first touch device in time domain;
    wherein the timing calibration process further comprises the first touch device transmitting one timing checking-and-adjusting signal, wherein the timing checking-and-adjusting signal is configured to instruct the active stylus to shift at least one second calibration downlink timeslot of a second calibration downlink signal to be transmitted,
    wherein at least one first waveform within at least one first calibration downlink timeslot of the first calibration downlink signal is respectively identical to at least one second waveform within at least one second calibration downlink timeslot of the second calibration downlink signal.

4. The synchronization method of claim 1, wherein the timing calibration process further comprises:
    the first touch device decoding the first calibration downlink signal to generate a decoding result; and
    the first touch device determining whether one of at least one calibration downlink timeslot of the first calibration downlink signal coincides with one of at least one touch period of the first touch device according to correctness of the decoding result or signal strength of the first calibration downlink signal.

5. The synchronization method of claim 1,
    wherein the uplink time length is a length of time for one of at least one uplink timeslot, the uplink period is a length of time between two adjacent ones of the at least one uplink timeslot, the downlink period is a length of time between two adjacent ones of at least one calibration downlink timeslot, the downlink time length is a length of time for one of the at least one calibration downlink timeslot, the downlink slot number is a total number of the at least one calibration downlink timeslot, and the edge-to-edge time length starts from a falling edge of one of at least one uplink timeslot and end at a rising edge of one of the at least one calibration downlink timeslot.

6. The synchronization method of claim 1, wherein the timing calibration process further comprises:
    the active stylus transmitting a second calibration downlink signal according to a second timing parameter,
    wherein both the first timing parameter and the second timing parameter are categorized as one of an uplink time length, an uplink period, an edge-to-edge time length, a downlink period, a downlink time length, and a downlink slot number,
    wherein a magnitude of the first timing parameter is unequal to a magnitude of the second timing parameter.

7. The synchronization method of claim 1, wherein
    wherein at least one first calibration downlink timeslot of the first calibration downlink signal coincides with at least one touch period of the first touch device respectively during the timing calibration process;

the first touch device transmits a timing calibration end signal, wherein the timing calibration end signal is configured to end the timing calibration process, and the active stylus transmits at least one operation downlink signal after the timing calibration process.

8. The synchronization method of claim 1, wherein at least one touch sensor of the first touch device senses the first calibration downlink signal transmitted from the active stylus.

9. The synchronization method of claim 1, wherein the timing configuration process comprises:

the first touch device splitting a timing configuration data into at least one timing configuration signal, wherein the timing configuration data is configured to indicate at least one timing parameter, the at least one timing parameter for downlink signal transmission comprises an uplink time length, an uplink period, an edge-to-edge time length, a downlink period, a downlink time length, or a downlink slot number; and the first touch device transmitting one of the at least one timing configuration signal, wherein the active stylus receives the at least one timing configuration signal one by one to integrate all of the at least one timing configuration signal back into the timing configuration data.

10. The synchronization method of claim 9, wherein the timing configuration data is divided into the at least one timing configuration signal according to bandwidth of uplink transmission.

11. The synchronization method of claim 1, wherein the first touch device transmits the at least one detect signal periodically or after the first touch device finds the active stylus using wireless communication technologies.

12. The synchronization method of claim 1, wherein at least one detect signal, the response signal, at least one timing configuration signal, at least one acknowledgement, a timing configuration end signal, at least one timing checking-and-adjusting signal, or a timing calibration end signal is transmitted using wireless communication technologies or a cable connected between the active stylus and the first touch device.

13. The synchronization method of claim 1, wherein at least one timing parameter for the first touch device is stored in a first timing table located in the active stylus, at least one second calibration downlink timeslot of a second calibration downlink signal which is transmitted according to the at least one timing parameter respectively coincides with at least one touch period for the first touch device, at least one third timing parameter for a second touch device is stored in a second timing table located in the active stylus, at least one third calibration downlink timeslot of a third calibration downlink signal which is transmitted according to the at least one third timing parameter respectively coincides with at least one second touch period for the second touch device.

14. The synchronization method of claim 1, further comprising:

a second touch device transmitting an uplink signal to the active stylus to indicate which timing table the active stylus is instructed to select; and the active stylus searching for a second timing table including at least one third timing parameter configured for the active stylus to transmit at least one second operation downlink signal properly.

15. The synchronization method of claim 1, wherein the timing configuration process starts after the active stylus is unable to find a timing table indicated by the first touch device.

16. The synchronization method of claim 1, further comprising:

the first touch device transmitting at least one detect signal to report a presence of the first touch device; or the active stylus transmitting the response signal after the active stylus detects one of the at least one detect signal.

17. A control circuit, for a touch device, comprising:

a processing circuit, configured to execute steps of:

determining whether an active stylus approaches the touch device;

starting a timing configuration process after the touch device receives a response signal from the active stylus; and starting a timing calibration process after the timing configuration process is completed, wherein the timing calibration process comprises transmitting, by the active stylus, a first calibration downlink signal according to a first timing parameter, wherein the first timing parameter is categorized as one of an uplink time length, an uplink period, an edge-to-edge time length, a downlink period, a downlink time length, or a downlink slot number, wherein the first timing parameter has been adjusted or is to be adjusted; and a storage circuit, coupled to the processing circuit.

18. A control circuit, for a computing device coupled to a touch device, comprising:

a processing circuit, configured to execute steps of:

instructing the touch device to start a timing configuration process after the touch device receives a response signal from an active stylus; and instructing the touch device to start a timing calibration process after the timing configuration process is completed, wherein the timing calibration process comprises transmitting, by the active stylus, a first calibration downlink signal according to a first timing parameter, wherein the first timing parameter is categorized as one of an uplink time length, an uplink period, an edge-to-edge time length, a downlink period, a downlink time length, or a downlink slot number, wherein the first timing parameter has been adjusted or is to be adjusted; and a storage circuit, coupled to the processing circuit.

19. A control circuit, for an active stylus, comprising:

a processing circuit, configured to execute steps of:

detecting a presence of a touch device;

transmitting a response signal to the touch device to start a timing configuration process; and starting a timing calibration process after the timing configuration process is completed, wherein the timing calibration process comprises transmitting, by the active stylus, a first calibration downlink signal according to a first timing parameter, wherein the first timing parameter is categorized as one of an uplink time length, an uplink period, an edge-to-edge time length, a downlink period, a downlink time length, or a downlink slot number, wherein the first timing parameter has been adjusted or is to be adjusted; and
a storage circuit, coupled to the processing circuit.

* * * * *